(12) United States Patent
Rothstein et al.

(10) Patent No.: US 10,744,556 B2
(45) Date of Patent: Aug. 18, 2020

(54) METHOD FOR FORMING A TOOTHED ARTICLE

(71) Applicant: American Axle & Manufacturing, Inc., Detroit, MI (US)

(72) Inventors: Moshe Rothstein, Oak Park, MI (US); Cory J. Padfield, Royal Oak, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 164 days.

(21) Appl. No.: 15/849,928

(22) Filed: Dec. 21, 2017

(65) Prior Publication Data

US 2019/0193140 A1    Jun. 27, 2019

(51) Int. Cl.
  *B21K 1/30*        (2006.01)
  *F16H 55/00*       (2006.01)
  *B23P 15/14*       (2006.01)

(52) U.S. Cl.
  CPC ................ *B21K 1/30* (2013.01); *B23P 15/14* (2013.01); *F16H 55/00* (2013.01)

(58) Field of Classification Search
  CPC .................................... B21K 1/30; B23P 15/14
  See application file for complete search history.

(56) References Cited

U.S. PATENT DOCUMENTS

| | | | | |
|---|---|---|---|---|
| 5,492,264 | A | * | 2/1996 | Wadleigh ............... B23K 20/12 228/112.1 |
| 5,806,373 | A | * | 9/1998 | Parker .................... B21K 1/30 74/432 |
| 6,326,089 | B1 | * | 12/2001 | Claxton ............... B23K 1/0008 228/113 |
| 8,475,321 | B2 | | 7/2013 | Gutsmiedl et al. |
| 8,710,393 | B2 | | 4/2014 | Okumura et al. |
| 8,961,349 | B2 | | 2/2015 | Kellogg |
| 9,156,110 | B2 | | 10/2015 | Chen et al. |
| 2008/0138649 | A1 | * | 6/2008 | Mataga ............. B23K 15/0006 428/684 |
| 2017/0152930 | A1 | | 6/2017 | Bojanowski et al. |

* cited by examiner

*Primary Examiner* — Christopher M Koehler
*Assistant Examiner* — Kyle A Cook
(74) *Attorney, Agent, or Firm* — Burris Law, PLLC

(57) ABSTRACT

A method for fabricating an article that includes: providing a first workpiece component formed of a first steel material; joining a second workpiece component to the first workpiece component to form a workpiece, the second workpiece component being formed of a second steel material that is different from the first steel material; and forming a plurality of teeth on the workpiece, the teeth being wholly formed of the first steel material.

5 Claims, 3 Drawing Sheets

METHOD FOR FORMING A TOOTHED ARTICLE

FIELD

The present disclosure relates to a method for forming a toothed article.

BACKGROUND

Gears, such as a hypoid ring gear of the type that is used in a modern axle assembly or power take-off unit, typically have one or more portions having one set of design and performance criteria, and one or more other portions having a different set of design and performance criteria. These different sets of design and performance criteria may relate to how the gear is loaded during its operation and/or to other considerations such as the manner in which the gear is joined or coupled to an input member or an output member. It is common practice in the industry to unitarily and integrally construct a gear from a single material having properties that permit the gear to meet or exceed one set of criteria. Often times, however, the material chosen is a compromise between the several sets of criteria and consequently, the gear may end up being more costly and/or having characteristics that are not as optimal as desired.

Accordingly, there remains a need in the art for an improved method for forming a toothed article.

SUMMARY

This section provides a general summary of the disclosure, and is not a comprehensive disclosure of its full scope or all of its features.

In one form, the present disclosure provides a method for fabricating an article. The method includes: providing a first workpiece component formed of a first steel material; joining a second workpiece component to the first workpiece component to form a workpiece, the second workpiece component being formed of a second steel material that is different from the first steel material; and forming a plurality of teeth on the workpiece, the teeth being wholly formed of the first steel material.

In another form, the present disclosure provides a method for fabricating an article. The method includes: forging a first workpiece component formed of a first steel material, the first workpiece having a plurality of teeth formed thereon; forging a second workpiece formed of a second steel material that is different from the first steel material, the second workpiece defining a set of locating features; joining the second workpiece component to the first workpiece component to form a workpiece; abutting the set of locating features on the workpiece to a mating set of locating features on a second workpiece to thereby position the workpiece to the second workpiece in a predetermined manner; and securing the workpiece to the second workpiece with the set of locating features on the workpiece abutted with the mating set of locating features on the second workpiece.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
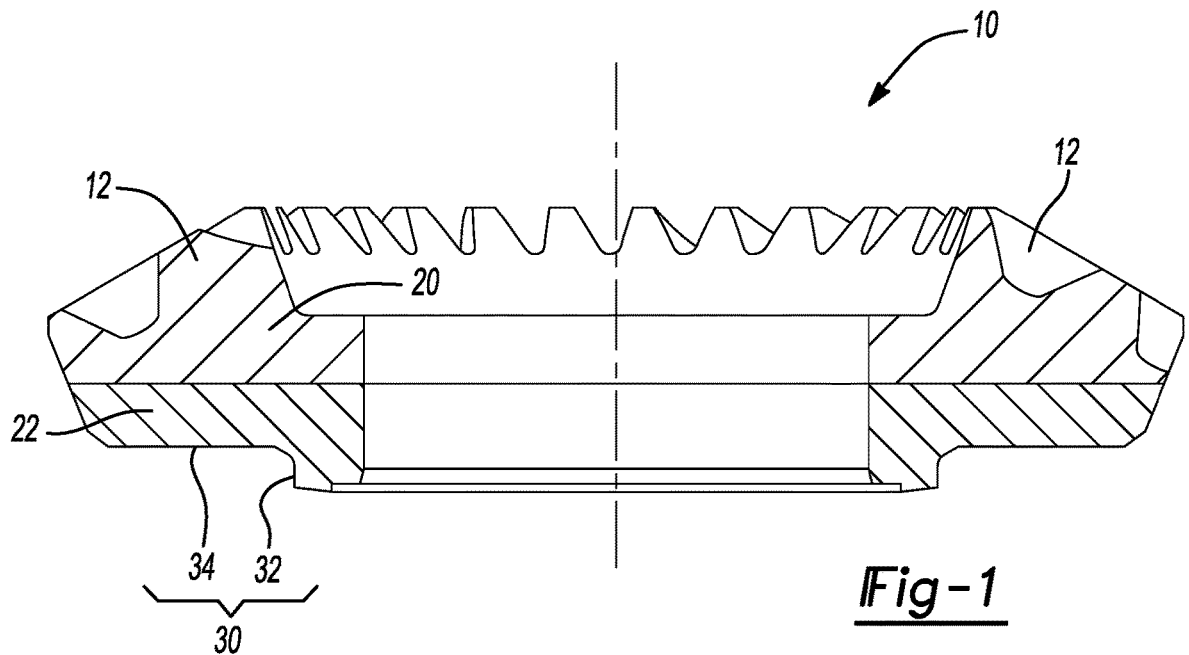
FIG. 1 is a section view of an exemplary article constructed in accordance with the teachings of the present disclosure.

With reference to FIG. 1, an exemplary article constructed in accordance with the teachings of the present disclosure is generally indicated by reference numeral 10. The article 10 is illustrated to be a hypoid ring gear of the type that is suited for use in driveline components, such as axle assemblies and power take-off units, but it will be appreciated that the teachings of the present disclosure have applicability to any type of article having teeth 12 formed thereon. The article 10 can be segregated into various portions having different design and performance criteria. In this example, the article 10 is segregated into a first portion 20 and a second portion 22. The first portion 20 includes the teeth 12 and its design and performance criteria can require relatively high hardness and strength. The second portion 22 can define a set of locating features 30 and its design and performance criteria can require relatively lower hardness and strength, as well as characteristics that are conducive to the welding of the article 10 to a second workpiece (not shown). The set of locating features 30 can include a circumferentially extending surface 32 and a radially extending surface 34, for example.

The first portion 20 can be formed of a first steel material, which can have a first carbon content (expressed in weight percent), while the second portion 22 can be formed of a second steel material that is different from the first steel material and can have a second carbon content (expressed in weight percent) that can be lower than the first carbon content.

Figure 2:
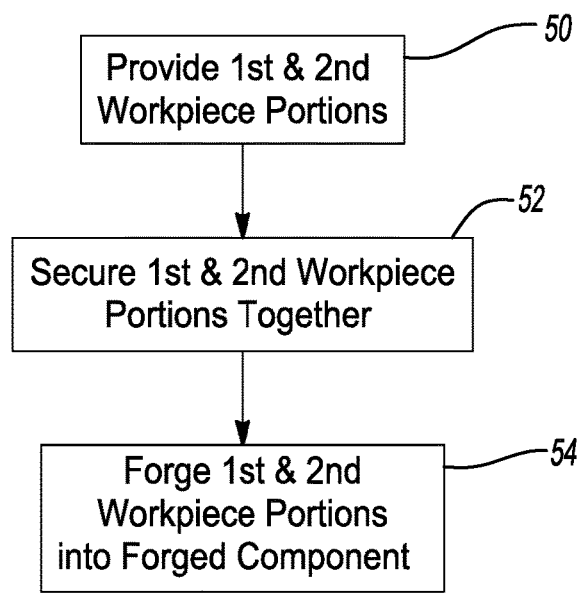
FIG. 2 is a schematic illustration in flowchart form of an exemplary method for forming the article of FIG. 1.

With additional reference to FIG. 2, a method for forming the article 10 will now be described. The method can begin at block 50, where a first workpiece portion and a second workpiece portion can be provided. The first workpiece portion can be formed of the first steel material and is intended to generally correspond to the first portion 20 of the article 10. The second workpiece portion can be formed of the second steel material and is intended to generally correspond to the second portion 22 of the article 10. In the example provided, each of the first and second workpiece portions is shaped as a length of hollow tubular steel stock and is machined in an appropriate manner to a predetermined length.

The method can proceed to block 52, where the first and second workpiece portions can be joined together to form a workpiece. In the example provided, the first and second workpiece portions are joined together via friction welding such that the first and second workpiece portions are bonded together across the area or zone in which they contact one another. It will be appreciated that various other types of joining methods could be employed to secure the first and second workpiece components to one another, such as resistance welding and diffusion bonding.

The method can proceed to block 54 where the workpiece can be forged to form the article 10. During the forging operation, one or more forging dies can be employed to form the teeth 12 and the set of locating features 30. Construction in this manner permits the teeth 12 to be formed wholly of the first steel material, and the set of locating features 30 to be wholly formed of the second steel material.

Figure 3:
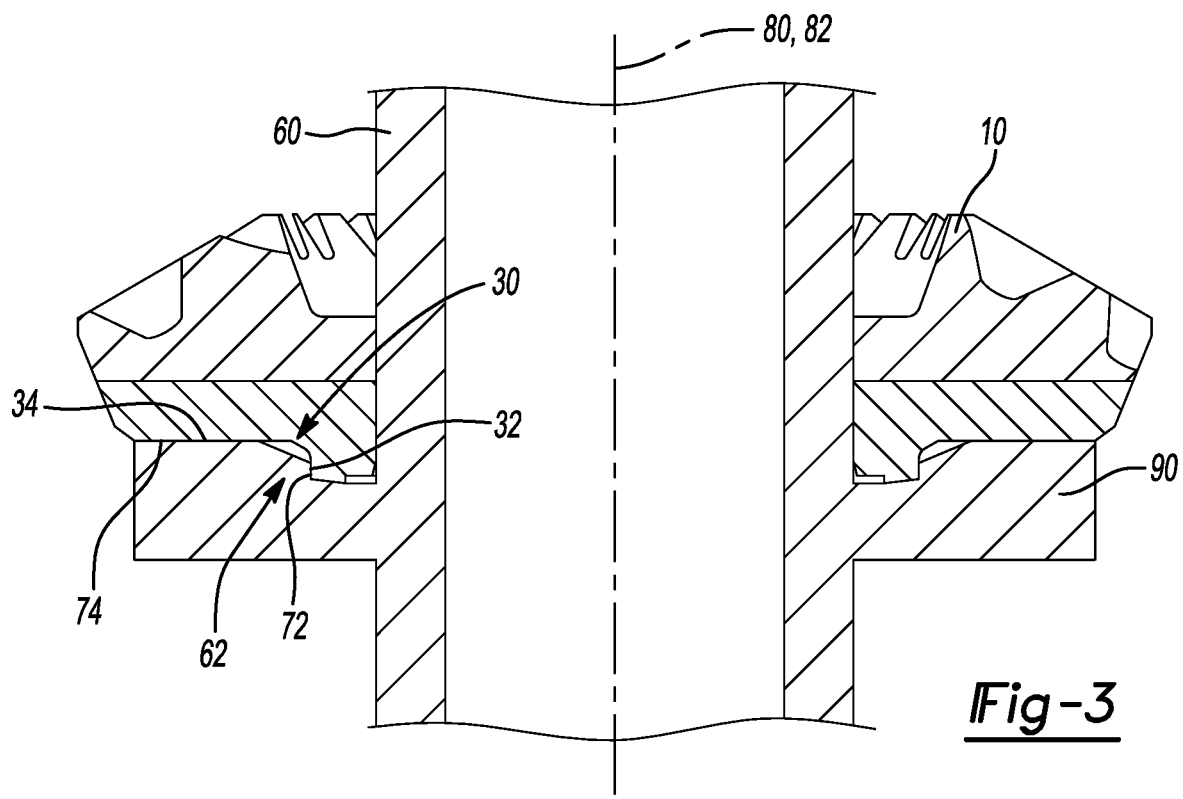
FIG. 3 is a section view of an assembly in which the article of FIG. 1 is secured to a second workpiece.

With reference to FIG. 3, the article 10 can subsequently be secured to a second workpiece 60. The second workpiece 60 can have a mating set of locating features 62 that are configured to matingly engage the set of locating features 30 on the article 10. In the example provided, the mating set of locating features 62 comprises a second circumferentially extending surface 72 and a second radially extending surface 74. The second circumferentially extending surface 72 can be defined by a bore in the second workpiece 60 and is configured to abut the circumferentially extending surface 32 on the article 10 to thereby center the article 10 to the second workpiece 60 such that the rotational axis 80 of the article 10 is coincident with the rotational axis 82 of the second workpiece 60. The second radially extending surface 74 can be formed on a flange 90 on the second workpiece 60 and is configured to abut the radially extending surface 34 on the article 10 to thereby position the teeth 12 along the rotational axis 82 of the second workpiece 60 at a desired location.

It will be appreciated that various operations can be performed on the article 10 prior to securing it to the second workpiece 60 if desired. For example, various surfaces on the article 10 can be turned or bored; the article 10 can be heat treated, and/or the teeth 12 can be machined and finished in a desired manner (e.g., lapped with the teeth of a mating gear).

Figure 4:
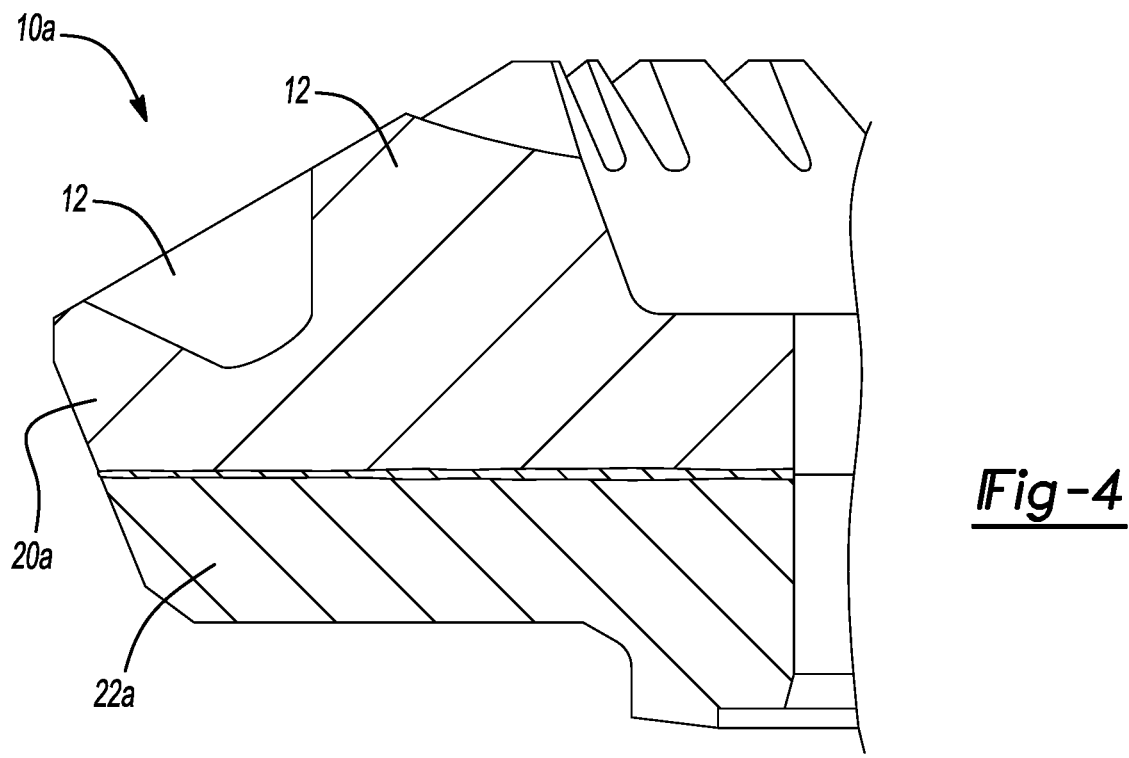
FIG. 4 is a section view of a portion of a second exemplary article constructed in accordance with the teachings of the present disclosure.

With reference to FIG. 4, another article constructed in accordance with the teachings of the present disclosure is generally indicated by reference numeral 10a. The article 10a can be formed of a first workpiece component 20a and a second workpiece component 22a that can be secured to one another in a desired manner, such as welding.

Figure 5:
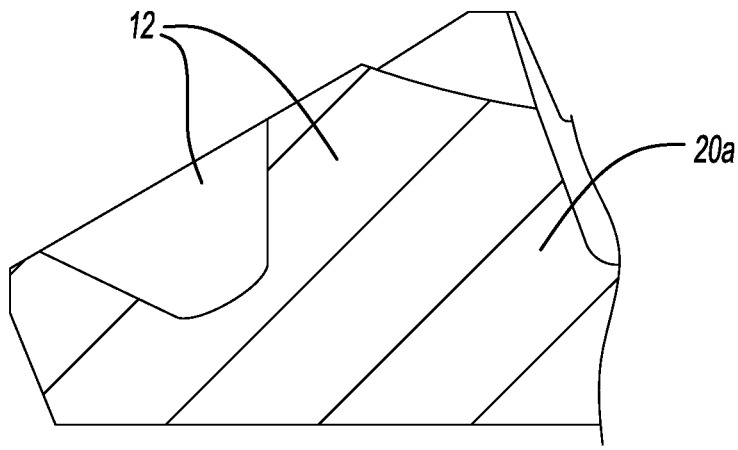
FIG. 5 is a section view of a portion of a first workpiece component employed in the fabrication of the article of FIG. 4.
Figure 6:
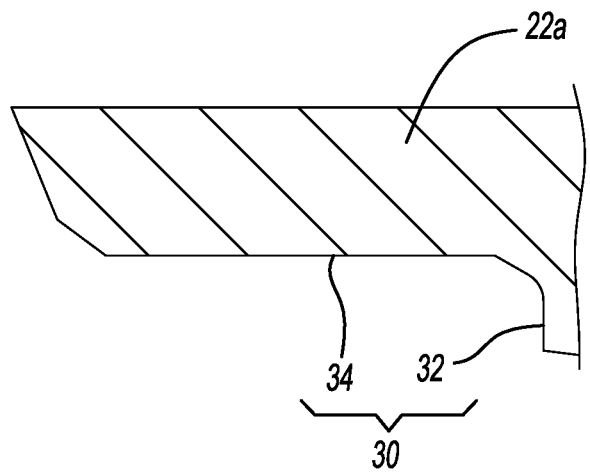
FIG. 6 is a section view of a portion of a second workpiece component employed in the fabrication of the article of FIG. 4.
Figure 7:
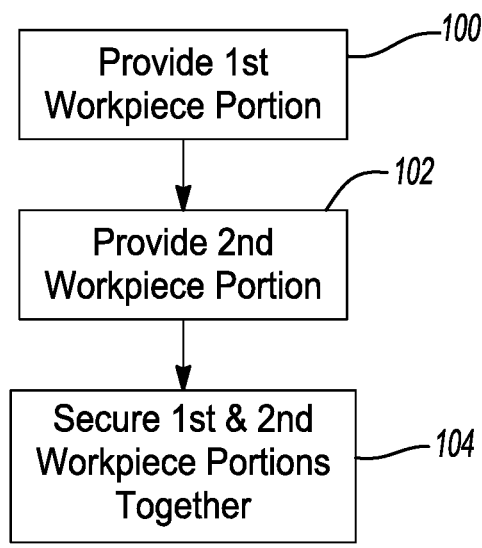
FIG. 7 is a schematic illustration in flowchart form of an exemplary method for forming the article of FIG. 4.

With reference to FIGS. 5 through 7, a method for forming the article 10a (FIG. 4) will be discussed. The method begins at block 100 where the first workpiece component 20a is provided. The first workpiece component 20a can be formed of the first steel material and can have a plurality of teeth 12 formed thereon. The first workpiece component 20a can be formed in a desired manner, such as forging. Moreover, features on the first workpiece component 20a can be finished in a desired manner. For example, the teeth 12 of the first workpiece component 20a can be machined and/or surfaces of the first workpiece component 20a can be turned or bored, and/or the first workpiece component 20a can be heat treated.

The method can proceed to block 102, where the second workpiece component 22a is provided. The second workpiece component 22a can be formed of the second steel material and can have the set of locating features 30 formed thereon. The second workpiece component 22a can be formed in a desired manner, such as forging. Moreover, features on the second workpiece component 22a can be finished in a desired manner. For example, surfaces of the second workpiece component 22a can be turned or bored as desired.

The method can proceed to block 104, wherein the first and second workpiece components 20a and 22a can be secured to one another. In the example provided, the first and second workpiece components 20a and 22a are secured to one another via friction welding.

It will be appreciated that various operations can be performed on the article 10a after the first and second workpiece components 20a and 22a have been secured together as desired. For example, various surfaces on the article 10a can be turned or bored; the article 10a can be heat treated, and/or the teeth 12 can be machined and finished in a desired manner (e.g., lapped with the teeth of a mating gear).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for fabricating an article, the method comprising:
   providing a first workpiece component formed of a first steel material;
   forging the first workpiece component to form a first forged workpiece component having a plurality of bevel gear teeth that are disposed about an axis;
   forming a second workpiece component that is formed of a second steel material that is different from the first steel material, the second workpiece component having a set of locating features; and
   joining the second workpiece component to the first forged workpiece component to form a workpiece via friction welding, the workpiece being a bevel gear having a frusto-conical surface that is defined by a back cone of a predetermined cone angle and which intersects the bevel gear teeth, the frusto-conical surface diverging inwardly toward the axis with increasing distance along the axis from the bevel gear teeth;
   wherein the first workpiece component has a first side and a second side, wherein the bevel gear teeth are disposed on the first side of the first workpiece component, wherein a through-bore is formed through the first workpiece component along the axis, wherein the second side of the first workpiece component is formed perpendicular to the axis and intersects the frusto-conical surface of the workpiece that is defined by the back cone such that the frusto-conical surface is partly formed by the first forged workpiece component and partly formed by the second workpiece component.

2. The method of claim 1, further comprising hardening the bevel gear teeth prior to joining the second workpiece component to the first forged workpiece component.

3. The method of claim 1, wherein the set of locating features comprise a circumferentially extending surface and a radially extending surface.

4. The method of claim 1, wherein the second steel material has a carbon content that is lower than a carbon content of the first steel material.

5. The method of claim 1, wherein the workpiece is a hypoid ring gear.

* * * * *